United States Patent [19]

McCabe

[11] 4,176,633

[45] Dec. 4, 1979

[54] GOVERNOR APPARATUS AND SYSTEM

[75] Inventor: Ralph P. McCabe, Troy, Mich.

[73] Assignee: Colt Industries Operation Corp., New York, N.Y.

[21] Appl. No.: 877,815

[22] Filed: Feb. 14, 1978

[51] Int. Cl.² .................... B60K 31/00; F02D 11/08
[52] U.S. Cl. .................. 123/102; 123/103 A; 123/103 R
[58] Field of Search .............. 123/102, 103 A, 103 B, 123/103 C, 103 D, 103 E, 103 R

[56] References Cited

U.S. PATENT DOCUMENTS

| | | | |
|---|---|---|---|
| 3,312,233 | 4/1967 | Young et al. ................. | 123/103 A |
| 3,381,771 | 5/1968 | Granger et al. ............... | 123/102 |
| 3,410,362 | 11/1968 | Fales et al. .................. | 123/102 |
| 3,596,642 | 8/1971 | Nakada ...................... | 123/103 R |
| 3,647,016 | 3/1972 | Fitzsimons et al. ........... | 123/102 |
| 3,900,013 | 8/1975 | Vignozzi et al. .............. | 123/102 |
| 3,914,619 | 10/1975 | Talmage et al. .............. | 123/102 |
| 4,006,791 | 2/1977 | Feldman et al. .............. | 123/102 |
| 4,106,584 | 8/1978 | Onatsubara .................. | 123/102 |

Primary Examiner—Charles J. Myhre
Assistant Examiner—R. A. Nelli
Attorney, Agent, or Firm—Walter Potoroka, Sr.

[57] ABSTRACT

A governor system for an engine motive fluid induction system is shown as having a solenoid operated valving assembly communicating with a source of vacuum and with a plurality of vacuum motors operatively connected to variably positionable throttle valves of the induction system; an electronic control sensitive to the speed of a monitored parameter is effective to controllably energize the solenoid valving assembly to, in turn, regulate the magnitude of vacuum directed thereby to the vacuum motors and consequently govern the then permissible amount of opening of the throttle valves.

15 Claims, 7 Drawing Figures

GOVERNOR APPARATUS AND SYSTEM

BACKGROUND OF THE INVENTION

Heretofore, the prior art has suggested various forms of speed governing devices; however, such have generally been found to be at least somewhat limited in their applications and more often then not the philosophy of such prior art devices precluded their use in arrangements or purposes other than that for which such were specifically designed. Further, many prior art governor devices have failed to provide either or both the accuracy of dependability of performance needed over all ranges of engine and/or vehicle operation. Also, such prior art devices have been unable to provide proper speed governing characteristics especially where such speed is to be ultimately determined as by a plurality of independently positionable throttle valves and where, further, parameters of engine speed and load are interdependent.

Accordingly, the invention as herein disclosed and claimed is primarily directed to the solution of such prior art problems as well as those related and attendant thereto.

SUMMARY OF THE INVENTION

According to the invention, the speed of monitored moving means is sensed by electrical means which in turn creates an output signal effective for controlling associated electrically energizable valving means which, in turn, functions to control the magnitude of vacuum applied to a plurality of pressure responsive motor means whereby such pressure responsive motor means become effective for positioning a plurality of related throttle valve means for ultimately governing the speed of such monitored moving means.

Various general and specific objects and advantages of the invention will become apparent when reference is made to the following detailed description considered in conjunction with the accompanying drawings.

BRIEF DESCRIPTION OF THE DRAWINGS

In the drawings wherein for purposes of clarity certain details and/or elements may be omitted.

DETAILED DESCRIPTION OF THE PREFERRED EMBODIMENT

Figure 1:
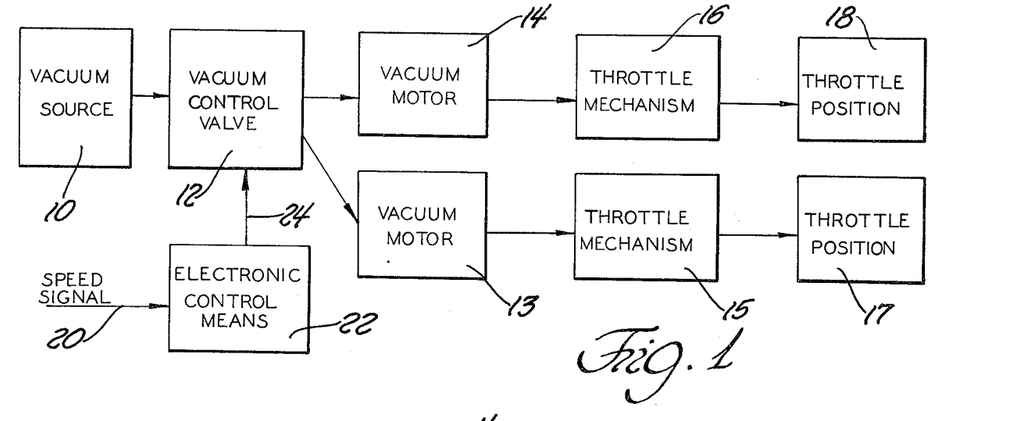
FIG. 1 is a block diagram of one particular speed governing system employing teachings of the invention.

Referring now in greater detail to the drawings, FIG. 1 illustrates a suitable pneumatic pressure or vacuum source 10 effective for supplying such pneumatic pressure or vacuum to a pressure or vacuum control means 12 which selectively varies the magnitude of the pressure or vacuum applied to related pressure responsive motor means 13 and 14 which are respectively operatively connected to associated throttle means 15 and 16 to thereby attain desired respective resulting throttle positions 17 and 18. A speed signal 20, obtained from apparatus the speed of which is to be governed, is applied to electronic control means 22 which, in responsive thereto, creates and applies a control signal as at 24 to the control means 12 as to thereby cause the control means to vary the magnitude of the pressure conveyed to motor means 13 and 14 in response thereto.

Figure 2:
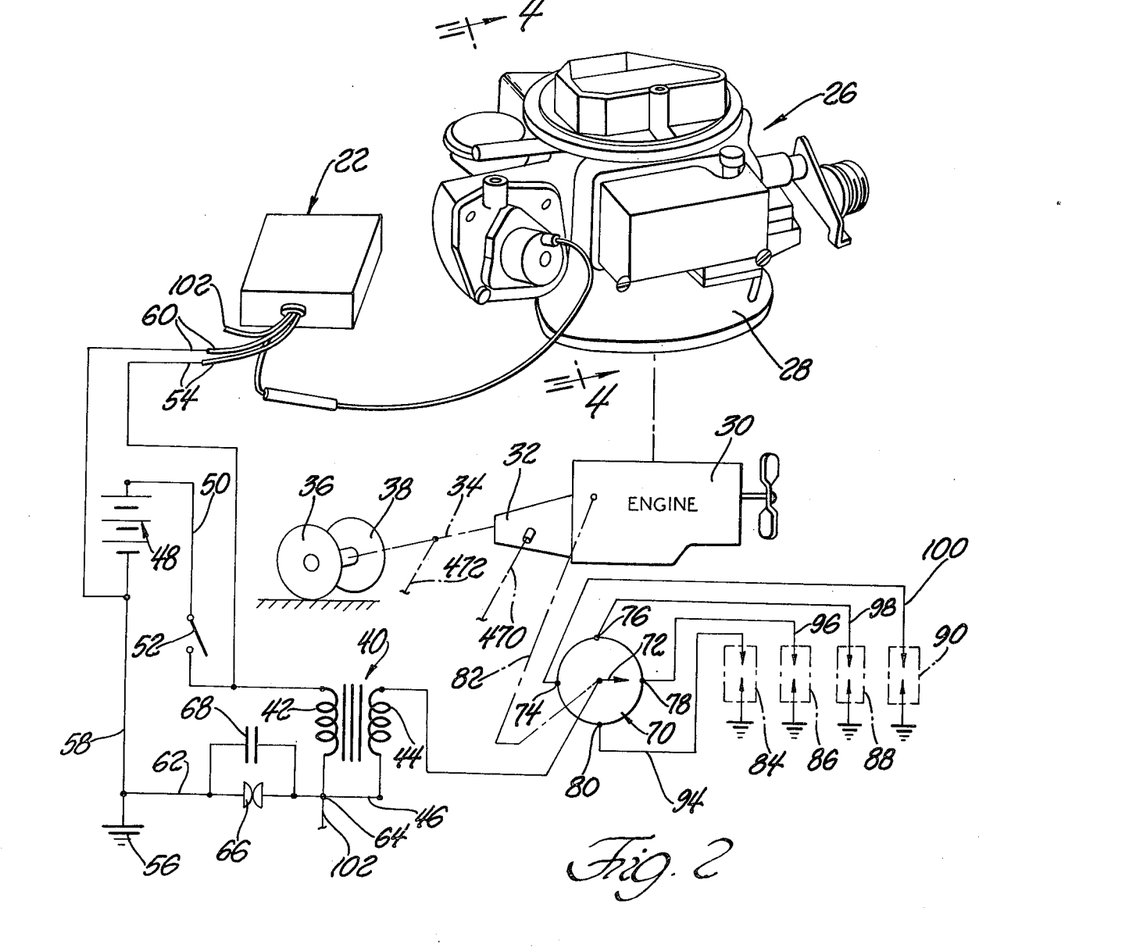
FIG. 2 is a view, partly schematic, partly diagrammatic and partly in perspective, of apparatus, the operation of which generally conforms to that of FIG. 1 and which employs teachings of the invention.

FIG. 2 illustrates an induction apparatus 26 (in the aspect of the invention disclosed by such FIG. 2 the apparatus 26 comprises a multi-induction-passage carburetor assembly) situated as atop an intake manifold (fragmentarily illustrated at 28) associated as with a combustion engine 30 which may be provided with suitable power transmission means 32 for supplying power as through shaft means 34 to ground engaging drive wheels 36, 38 of an associated vehicle.

As generally schematically illustrated, the engine 30 may be provided with a suitable ignition system comprised of, for example, an ignition coil assembly 40 having a primary winding 42 and a secondary winding 44 with respective one ends of each of such windings being electrically interconnected as by conductor means 46. The other end of primary winding 42 is electrically connected as to the plus (+) side of a suitable source of electrical potential 48 as by conductor means 50 and a manually operated serially situated switch means 52. The same plus (+) side of electrical potential source 48 is electrically connected via switch 52 and conductor means 54 to the electronic control means 22. As shown, the other electrical side of source 48 is electrically connected to ground 56 as by conductor means 58 and to the electronic control means 22 as by conductor means 60. Conductor means 62 electrically generally between ground 56 and juncture 64, has serially situated ignition breaker contacts 66 which, as is well known, open and close in timed relationship to engine operation. As is generally customary, in such systems, suitable capacitor means 68 are preferably applied across breaker contacts 66.

Suitable ignition distributor means schematically illustrated as at 70 comprises an electrically conductive rotor 72 (rotated in timed relationship to engine operation) so as to sequentially cause electrical conduction as between the rotor 72 and spaced terminals 74, 76, 78 and 80. As generally depicted, rotor 72 may be driven by means 82 operatively connected to engine 30. A plurality of spark or igniter plug assemblies 84, 86, 88 and 90 are respectively electrically connected by conductor means 92, 94, 96, 98 and 100 to ignition distributor terminals 80, 78, 76 and 74. Generally, as is well known, the cyclic opening and closing of breaker contacts 66 causes a building and a collapse of a field in the coil assembly 40 thereby creating a high voltage generally across the secondary winding 44 which is discharged through the rotor 72 as it functionally contacts a terminal in the distributor assembly 70 resulting in an ignition spark occurring at the related spark plug assembly.

As also illustrated in FIG. 2, a conductor 102, electrically connected as to juncture 64 is connected to the electronic control 22 and serves to convey a speed signal thereto.

Figure 3:
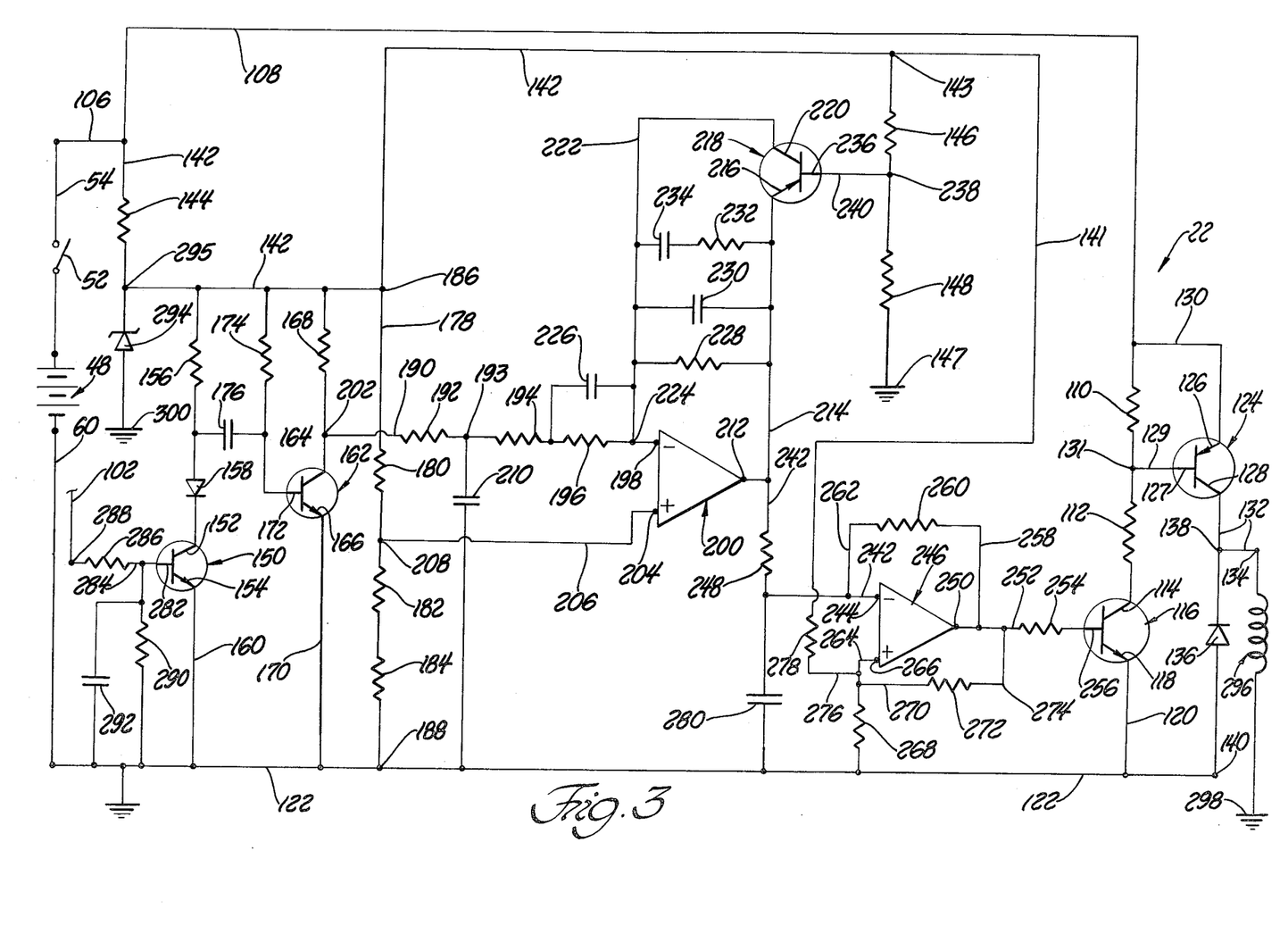
FIG. 3 is a schematic wiring diagram of one form of electronic control means employable in the invention.

Referring to FIG. 3, the electronic control means 22 is illustrated as comprising conductor means 106 electrically connected to conductor means 54 and connected at an other end to conductor means 108 containing serially situated resistors 110 and 112 and leading to the collector 114 of a first transistor 116 the emitter 118 of which is electrically connected to conductor means 122 as by conductor means 120.

A second transistor 124, has its emitter 126 connected via conductor 130 to conductor means 108 as to be on the conductor 106 side of resistor 110 while the base 127 is connected via conductor 129 to conductor means 108 as at a point 131 generally between resistors 110 and 112. The collector 128 is connected to a terminal 134 as by conductor means 132. A diode 136 is placed as to be generally across conductors 132 and 122 and connected thereto as a points 138 and 140.

Conductor 106 is also electrically connected to conductor means 142, containing resistors 144, 146 and 148, and leading as to ground as at 147. A third transistor 150 has its collector electrode 158 electrically connected to conductor means 142 as by serially situated diode means 158 and resistor means 156 while the emitter electrode 154 of transistor 150 is electrically connected to conductor means 122 as by conductor 160.

A fourth transistor 162 is illustrated as having its collector electrode 164 electrically connected to conductor means 142 as through resistor means 168 while the emitter electrode 166 thereof is connected via conductor 170 to conductor means 122. The base 172 of transistor 162 is electrically connected to conductor means 142 through resistor means 174. Capacitor means 176 is provided as to have one electrical side thereof electrically connected to and between resistor means 156 and diode 158, while the other electrical side thereof is electrically connected as to be connected to and between resistor means 174 and base electrode 172.

Conductor means 178 connected to conductor 142, as at 186, contains serially situated resistors 180, 182 and 184 and is connected to conductor 122 as at 188.

Conductor means 190, containing serially situated resistor means 192, 194 and 196, is electrically connected at one end as to terminal 198 of amplifier means 200. The other end of conductor means 190 is electrically connected as at a point 202 generally between collector electrode 164 and resistor 168. The other input terminal 204 of amplifier means 200 is connected as by conductor means 206 to conductor means 178 as at a point 208 generally between resistors 180 and 182.

The output terminal 212 of amplifier means 200 is electrically connected to conductor means 214 leading to an emitter electrode 216 of a transistor 218 which has its collector electrode 220 connected as by conductor means 222 to conductor 190 as at a point 224 generally between resistor 196 and input terminal 198. A capacitor means 226 may be placed generally in parallel with resistor 196. As shown, a resistor 228 and a capacitor 230 are placed in parallel relationship with each other as to be respectively electrically across conductors 222 and 214. Further, a resistor 232 and capacitor 234 are arranged in series relationship with respect to each other and also placed electrically across conductors 222 and 214. The base terminal 236 of transistor 218 is electrically connected as by conductor means 240 to conductor means 108 as at a point 238 generally between resistors 146 and 148.

The output terminal 212 of amplifier means 200 is also electrically connected to conductor means 242, containing therein resistor means 248, and electrically connected to an input terminal 244 of amplifier means 246. The output terminal 250 of amplifier means 246 is electrically connected to the base terminal 256 of transistor 116 as by means of conductor 252 and serially connected resistor 254. As illustrated, conductor 258, resistor 260 and conductor 262 inter-connecting the output terminal 250 to the input 244 serve as a feedback network. A conductor 264, electrically connected to amplifier means 246 as at its second input terminal 266 contains a series resistor 268 through which it is connected to conductor means 122. Conductor means 270, resistor 272 and conductor means 274 are electrically connected as to be generally across conductors 264 and 252. Further, resistor means 278 and series conductor means 276 are connected at one end to conductor means 264 as at a point generally between terminal 266 and resistor 268, and connected at the other electrical end as through conductor means 141 to conductor 142 as at 143. Suitable capacitor means 280 is illustrated as being placed as to have one electrical side thereof in electrical connection to conductor means 242 as at a point generally between resistor 248 and input terminal 244 of amplifier means 246 while the other electrical side thereof is electrically connected to conductor means 122.

Transistor means 150 has its base electrode 282 electrically connected via conductor means 284 and serially situated resistor means 286 to a related input terminal 288. A resistor 290 is shown as having one electrical end thereof connected to conductor 284 as at a point to be generally between resistor 286 and base terminal 282 while the other electrical end of resistor 290 is connected to conductor means 122. Suitable capacitor means 292 is placed as to be generally in parallel with resistor 290.

The output terminal 134 is electrically connected to electrical load means 296, which in this instance is the coil winding of solenoid means to be described, and through such load means to ground as at 298. Also, zener diode 294 is provided as to be connected to ground, as at 300, and to conductor means 142 as at 295. Conductor means 122 is shown to be electrically connected back to source 48 as by conductor means 60.

Generally, as can be seen, the source 48 provides the power for the circuitry of FIG. 3 and provides the energizing power for solenoid winding 296 through power transistor 124. Resistor 144 and zener diode 294 comprise a small regulated power supply for the circuitry generally between point 295 and ground. The zener diode 294 also provides for a relatively temperature stable voltage.

With reference to FIG. 2, it can be seen that every time breaker contacts 66 open point 64 experiences a positive voltage value which, in fact, may have spike-like characteristics, and every time such breaker contacts 66 close the same point 64 goes to electrical ground. Since the opening and closing of contacts 66 occurs in timed relationship to engine operation, such positive voltage pulses at point 64 may be employed as a signal reflective of the speed of engine operation. Such positive voltage pulses are applied via conductor 102 to speed signal input terminal 288 and, through resistor 286, to the base terminal 282 of transistor 150.

Transistors 150 and 162 comprise a monostable "one-shot" multivibrator so that every time the speed signal positive voltage pulse is generated at point 64 (FIG. 2) a positive pulse occurs at the collector 164 of transistor 162 and such positive pulse will be of a constant amplitude and constant pulse width.

Such pulses at collector 164 are transmitted via conductor 190 and resistors 192, 194 and 196 to amplifier means 200 and its associated circuitry. The pulses thusly applied to amplifier means 200 are somewhat substantially averaged or made more smooth because of the associated capacitor means as to have the voltage at the output 212 of amplifier means more nearly resemble a direct current (d.c.) voltage value. The magnitude of the output voltage at 212 will be proportional to the frequency of the positive pulses going into transistor 150 from point 66 of the ignition system and therefore proportional to the engine speed.

Amplifier 200 comprises certain components which serve to provide the function of anticipation of changes in the signal generated as at point 66 and thereby provide for a more stable circuit.

Transistor 218 serves to limit the maximum voltage to which the output 212 of amplifier 200 may go.

Oscillator-amplifier means 246 produces pluses which turn on, or make conductive, transistor 116 and output or power transistor 124. If the output voltage from amplifier means 200 is relatively high in magnitude, the output of amplifier 246 becomes a pulse train which has a narrow "on" time relative to its "off" time. If the output of amplifier 200 is relatively low in magnitude then the output of oscillator 246 is a train of pulses which has an "on" time that is long compared to its "off" time.

The output pulses from oscillator means 246 serve to turn transistors 116 and 124 "on" and "off" and correspondingly energize and de-energize solenoid winding 296. Therefore, as the ratio of the "on" time to the "off" time of the pulses from oscillator 246 changes the ratio of the "on" (or energized) time to the "off" (or de-energized) time of the solenoid changes and, as will become evident, changes the magnitude of the control vacuum in the overall system. A low ratio of "on" to "off" time produces a low magnitude of vacuum while a high ratio of "on" to "off" time produces a high magnitude of vacuum.

It should be noted that if the speed of the engine 30 is low, the magnitude of the output at 212 of amplifier means 200 is high and as the engine speed increases and the frequency of the pulses at point 202 increases then the magnitude of the output of amplifier 200 is actually reduced.

Diode 136, generally electrically across solenoid winding 296, is a high voltage suppresser and absorbs the high energy inductive pulse caused when the solenoid is turned "off" (de-energized).

More specifically, resistor 144 limits the current through the zener diode 294 and provides the voltage drop difference between the zener 294 voltage and the source or battery 48 voltage. In the input circuit to transistor 150, resistors 286 and 290 along with capacitor 292 comprise an input filter circuit which serves to bypass the high frequency components of the input signal and prevents undesired triggering of transistor 150.

In the absence of a positive input pulse at terminal 288, transistor 150 is in its "off" or non-conductive state while transistor 162 is in its "on" or conductive state by bias resistor 174. In this state, capacitor 176 is charged to approximately the voltage dtop across conductors 142 and 122 with the left side of capacitor 176 being positive (+). When the speed signal positive pulse from point 64 turns transistor 150 "on" (conductive) the left side of capacitor 176 is, for all practical purposes, suddenly taken to ground potential through collector 152, emitter 154 and conductor 160. Consequently, the voltage across capacitor 176 is of such a polarity as to turn transistor 162 "off."

Current will then flow through resistor 174 and capacitor 176 tending to charge the capacitor 176 in the opposite direction; that is, with the right side of capacitor 176 being positive. When the voltage across capacitor 176 builds up to a sufficient magnitude, transistor 162 will turn "on" (become conductive) again.

The base 172 to emitter 166 voltage of transistor 162 is a function of temperature; therefore the voltage across capacitor 176 at which transistor 162 turns back "on" is also a function of temperature. However, such variations due to temperature are eliminated by the presence of diode 158 which serves to compensate for temperature varations in the emitter to base voltage of transistor 162. Such occurs because the temperature characteristics of diode 158 and the emitter-base diode of transistor 162 are similar.

When transistor 150 turns back to its "off" or non-conductive state, then capacitor 176 is re-charged through resistor 156 and the emitter-base diode of transistor 162.

When transistor 162 is turned "off" then its collector 164 and point 202, for all practical purposes, assume the full positive voltage of conductor 142 as at, for example, the value of point 295 or point 186. As soon as capacitor 176 becomes sufficiently charged, then transistor 162 will turn "on" again and bring collector 164 and point 202 generally to ground potential as through emitter 166 and conductor 170.

The positive pulses thusly created at point 202 are applied to capacitor 210 as to generally accumulate there and develop, in effect, a.d.c. like voltage across capacitor 210 with such having slight ripples.

Resistors 180, 182 and 184 comprise voltage divider means. Amplifier means 200, in effect, is amplifying the voltage difference between point 208 and point 193 which exists generally between resistors 192 and 194. At low engine speeds, the voltage at point 193 is also of relatively low magnitude and tends to make the magnitude of the output at 212 of amplifier 200 relatively high. However, the maximum magnitude of such output at 212 is determined and/or limited by transistor 218.

That is, base 236 of transistor 218 is connected as at point 238 to voltage divider means, comprised of resistor means 146 and 148. Therefore, if the emitter 216, which is connected to output 212 of amplifier 200, starts to exceed the voltage value at point 238 then transistor 218 will turn "on" (becomes conductive) and, in effect electrically short across amplifier 200 and effectively limit the output of amplifier 200 to substantially the magnitude of the voltage at point 238. This assures that capacitors 230 and 234 will not excessively charged, and result in a prolonged discharge time, thereby assuring such capacitors 230 and 234 to be working within a desired operating range.

As the pulse frequency at point 202 increases capacitor 210 starts to become positive (+) relative to point 208 and, since such positive voltage is connected to the inverting input of amplifier 200, the increasing magnitude of the positive voltage causes the magnitude of the output voltage, at point 212, to decrease.

Capacitor 226 is employed to provide a lead component which serves to increase the gain of amplifier 200. Therefore, this effectively functions as an anticipation circuit which prevents large magnitudes of engine overspeed.

Capacitor 234 and resistance 232 are employed to provide a lag function and reduce the dynamic gain of the amplifier 200 as to result in the complete closed loop governor system to be stable and free of oscillations (often referred to as a "hunting effect").

Capacitor 230 is employed to filter-out the pulsations of the d.c. voltage across capacitor means 210 by providing gain reduction and lag at the one-shot speed signal ripple frequency.

Accordingly, it can be seen that the amplifier means 200 comprises means for providing a lead and gain (an anticipation circuit function) as well as providing for a lag and attenuation (a stability function).

Transistor 218 serves to short out the lag components at all engine speeds except at or near the governing speeds. Therefore, the lead function is effective at all speeds thus providing an exceptionally good anticipation response and the lag function is effective only at the governing speeds thereby providing desired stability at governing speeds.

Oscillator means 246 produces a pulse train output which has a variable pulse-to-width ratio depending on the output of amplifier 200. Assuming, for example, that amplifier 200 is providing some intermediate output voltage in its operating range, then current will flow into capacitor 280. The inverting input terminal 244 of amplifier oscillator 246 is effectively connected to capacitor 280 as by conductor means 242 while the non-inverting terminal 266 is connected to voltagw divider means comprised of resistor means 278 and 268. If the voltage across capacitor 280 is less than the voltage at terminal 266 then the output at 250 of oscillator-amplifier means 246 will be of a relatively high magnitude. In such a situation, current flows from resistor 272 through resistor 268 and to the voltage drop across resistor 268 so as to thereby actually increase the voltage drop thereacross as compared to what would be otherwise occurring due to the voltage divider 278, 268 itself.

As current continues to flow into capacitor 280, the voltage across resistor 268 continues to increase until it reaches a magnitude which exceeds the voltage at terminal 264. When this happens, the output of amplifier 246 suddenly decreases to a relatively low magnitude approaching ground potential. This, in turn, will cause the termination of current which was flowing through resistor 272 into resistor 268. Consequently, the voltage across resistor 268 will decrease by an amount corresponding to that previously contributed by resistor 272. At the same time, as the output of amplifier 246 is thusly reduced in magnitude, resistor 260 becomes electrically connected from the top side of capacitor 280 to the voltage (almost ground potential) on conductor 252 thereby tending to discharge capacitor 280. The capacitor 280 will thusly continue to discharge until the voltage thereacross attains the magnitude of the voltage at terminal 266 established when current flow through resistor 272 was terminated as previously described. When the capacitor 280 is thusly effectively discharged, the output of oscillator-amplifier means 246 again becomes a relatively high magnitude. Such oscillation continues; however, the higher the output voltage of amplifier 200 becomes, the shorter becomes the time that amplifier 246 will be producing a high magnitude output. That is, when the voltage output at amplifier 200 is relatively high, it takes less time to charge capacitor 280. In fact, if the output of amplifier 200 is high enough, amplifier 246 will never turn on because the voltage at point 244 will be higher than at terminal 266.

As the voltage output from amplifier 200 is decreased, amplifier 246 will oscillate with ever widening pulse widths. If the output of amplifier 200 should become sufficiently low, the output of amplifier means 246 will remain high.

The pulses out of amplifier 246 are applied, through current limiting resistor 254 to the base 256 of transistor 116. When transistor 116 is turned "on" (made conductive) by such pulses from amplifier 246, it, in turn, will cause transistor 124 to be turned "on" (conductive). In the arrangement shown, resistor 112 is a current limiting resistor while resistor 110 assures that none of the leakage current from transistor 116 will be able to turn transistor 124 "on" when both transistor 116 and 124 should be "off."

In view of the preceding, it can be seen that the relative percentage of time that electrical load (solenoid winding) 296 is energized is proportional to the speed signal received at terminal 288 and therefore proportional to the speed of the moving means being monitored.

Figure 4:
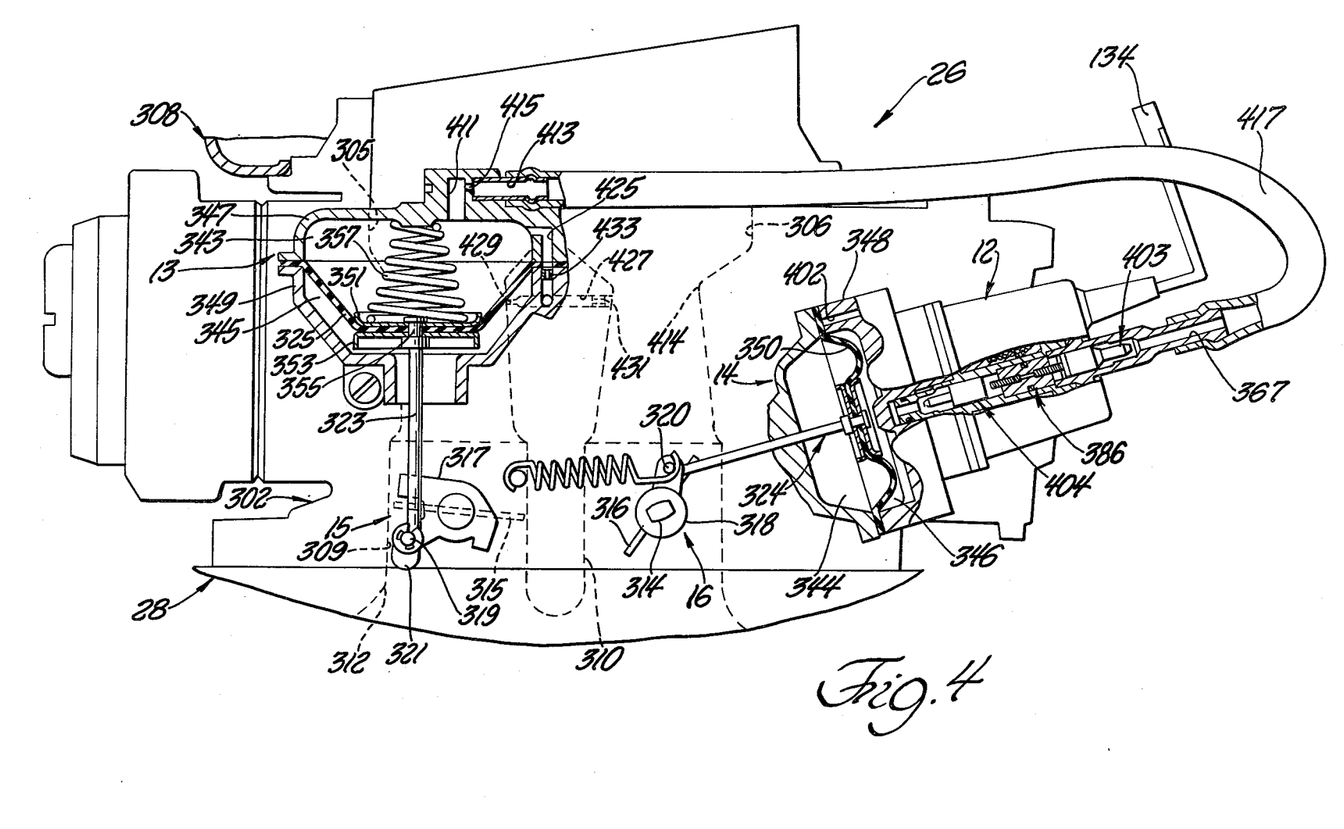
FIG. 4 is a relatively enlarged partly cross-sectional view taken generally on the plane of line 4—4 of FIG. 2 and looking in the direction of the arrows, with certain portions shown in elevation and additional other related portions shown in hidden line.
Figure 5:
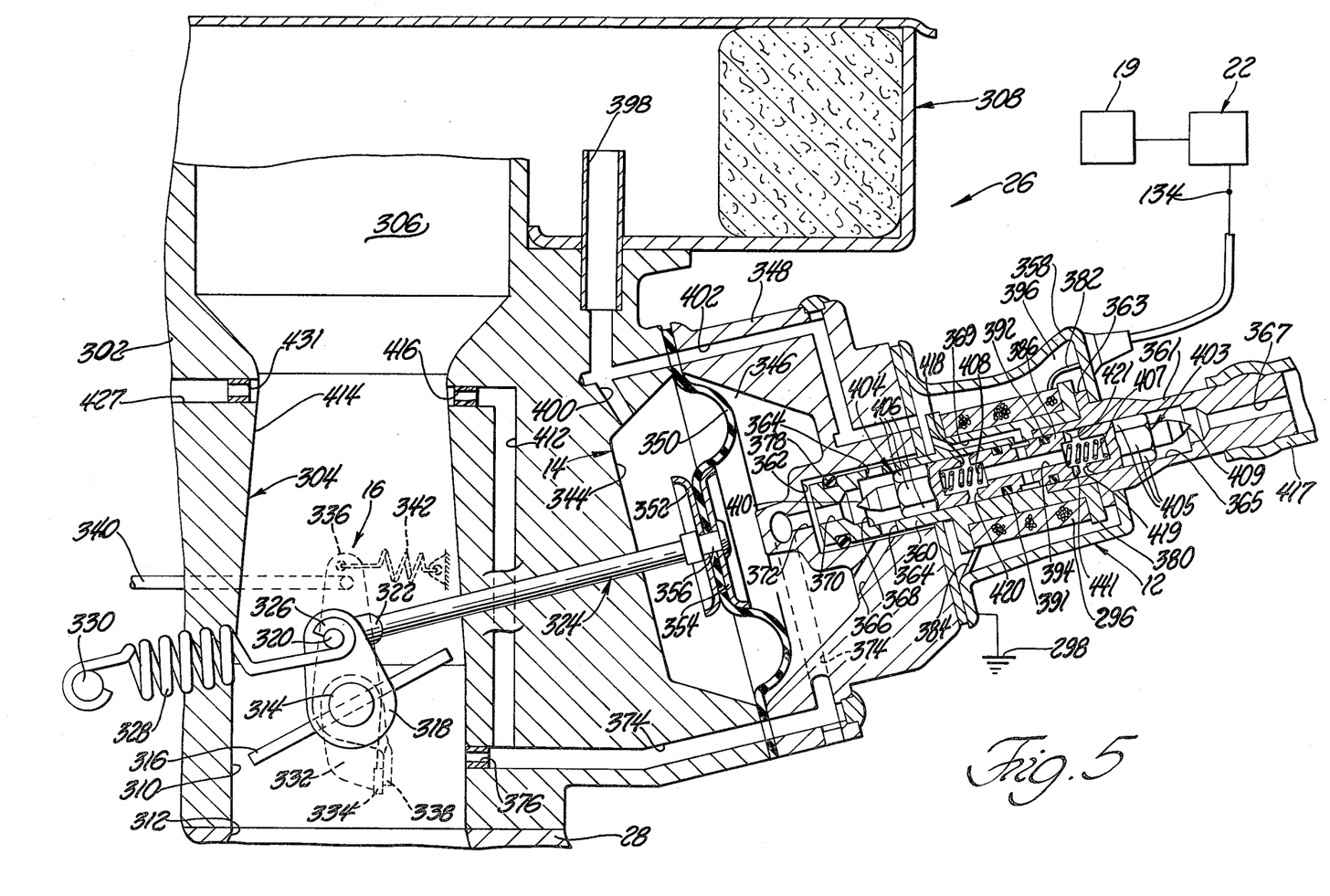
FIG. 5 is an enlarged view of a portion of the structure shown in FIG. 4.
Figure 6:
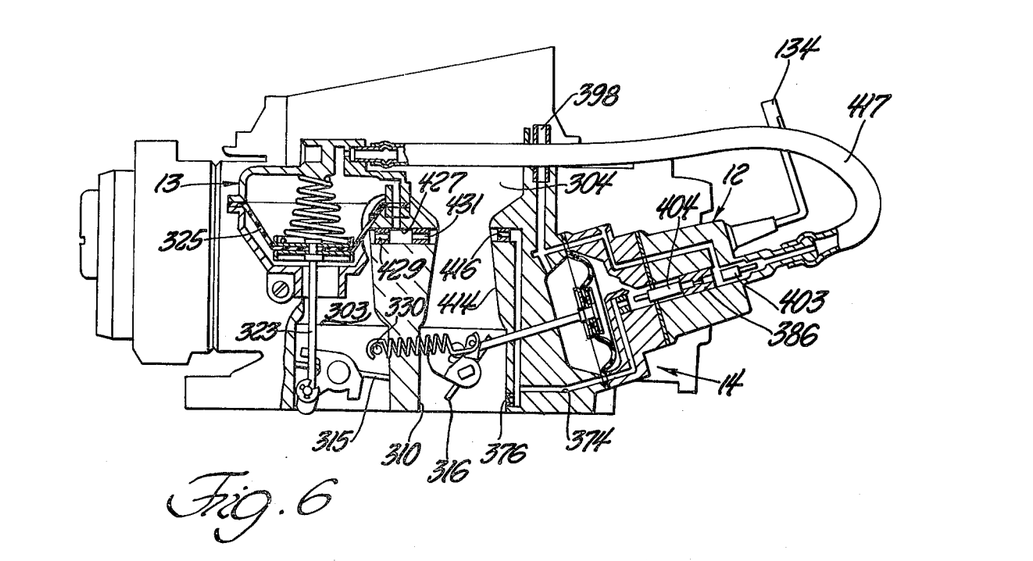
FIGS. 6 and 7 are each views, of a comparatively reduced scale and similar to that of FIG. 4 with each of said FIGS. 6 and 7 illustrating certain of the elements in simplified form, as compared to the preceding Figures, and also illustrating in cross-section related structure and pneumatic circuitry as to clearly disclose the interrelationship thereof.

In FIGS. 4, 5 & 6 the carburetor body 302 is illustrated as having generally primary and secondary induction passage means 304 and 303 formed therethrough and communicating as at the respective top or inlet ends 305 and 306 with the interior of an inlet air cleaner assembly 308 while communicating at the respective lower or outlet ends 309 and 310 with the interior passage means 312 of engine intake manifold 28.

Among other things, the throttle mechanism 16 comprises a throttle shaft 314, journalled as within body 302, fixedly carrying a throttle valve 316 for rotation therewith. A first lever 318 fixedly secured to throttle shaft 314 for rotation therewith carries a journal-like pin 320 which serves to both pivotally connect thereto one end 322 of a rod member 324 as well as one end 326 of a calibration spring 328 which is suitably anchored as at 330 and which continually urges throttle shaft 314 and throttle valve 316 in the counter-clockwise throttle-opening direction.

A second lever 332, also fixedly secured to throttle shaft 314 for rotation therewith, has a generally transversely extending abutment portion 334. A third lever 336, carried by throttle shaft 314 and pivotally rotatable relative thereto also has a generally transversely extending abutment portion 338 which is effective to operatively engage abutment 334 of lever 332. Manually actuatable throttle control linkage means 340 is operatively connected to lever 336 so that upon movement generally to the left, abutment portion 338 is moved counter-clockwise while spring 328 through lever 318, shaft 314 and lever 332 causes abutment 334 to follow (in engagement) abutment 338 thereby resulting in throttle opening movement.

Upon release of linkage means 340, a second spring 342 which may also be operatively connected to lever 336, effectively overcomes the force of calibration spring 328 and rotates throttle shaft 314 and throttle valve clockwise toward the nominally closed throttle position. Accordingly, it can be seen that levers 332 and 336 along with abutment portions 334 and 338 comprise a clutch-like mechanism whereby, in effect, the throttle 316 is permitted to open up to the degree that it operatively engages movable abutment means the position of which is determined by throttle control linkage means 340.

Somewhat similarly, the throttle mechanism 15 comprises a throttle shaft 313, journalled as within body 302, fixedly carrying a throttle valve 315 for rotation therewith. A lever 317 fixedly secured to throttle shaft 313 for rotation therewith carries a journal-like pin 319 which serves to pivotally connect one end 321 of a rod member 323 to lever 317. The other end of rod 323 is operatively connected to the pressure responsive movable wall means or diaphragm means 325 of the motor means 13.

The vacuum motor means 13 is illustrated as comprising first and second general chambers 343 and 345, generally formed at opposite sides of diaphragm means 325 which is effectively peripherally sealably retained by and between opposite housing sections 347 and 349. Oppositely situated diaphragm backing plates 351 and 353 serve to operatively connect the opposite end 355 of rod 323 to the diaphragm 325. A spring 357 situated within chamber 343 urges diaphragm 325 downwardly, as to the position depicted in FIG. 4, causing the secondary throttle valve means 315 to be rotated to a closed position.

The vacuum motor 14 is illustrated as comprising first and second chambers 344 and 346, generally respectively formed in body 302 and cooperating housing section 348, and separated as by a pressure responsive movable wall means or diaphragm 350 which is effective peripherally sealably retained by and between body 302 and housing section 348. Oppositely situated diaphragm backing plates 352 and 354 serve to operatively connect the opposite end 356 of rod 324 to diaphragm 350.

Referring to FIGS. 4 and 5, the vacuum control valve assembly 12 is illustrated as comprising a bell-like housing 358 suitably sealingly secured to and carried by housing section 348. A first valve housing 360 is partly closely received by and retained within a cooperating recess or chamber 362. Valve housing 360 has a plurality of radially directed ports 364 which communicate as between an inner chamber or passage 368 formed in valve housing 360 serves to communicate as between inner chamber 368 and one end 372 of a conduit 374 leading to the primary induction passage means 304 and having its other end preferably provided as with suitable calibrated restriction means 376. A suitable, for example, O-ring seal 378 is preferably provided as to preclude any undesirable communication as between conduit 374 and ports 364 and/or passage 366.

The other end of valve housing 360 may be provided with a bobbin like portion 380 for effectively carrying the solenoid winding 296 which may have a lead portion 382, electrically interconnected as to terminal 134, and a second portion 384 electrically connected as to ground 298. A second valve housing 361 is shown as being partly closely received as within a counterbore portion of bobbin 380 and held in such assembled relationship as by housing 358 engaging a flange portion 363 and urging such toward bobbin 380. A main passage 365 slidably receives a valve 403 therein and generally at one end communicates with a passage or conduit 367 and, at generally the opposite end, communicates with passage or conduit means 394 formed within a generally medially situated and fixed insert 386. Passage means 394, as through radially directed conduit portions, communicates with the interior chamber 396 via suitable conduit means 369 formed as in bobbin 380. Suitable seals, for example, O-ring seals 391 and 392 are preferably provided about member 386. Passage means 394 formed in member 386 serves to complete communication as between the chamber 396, generally within bell housing 358, and inner chamber or passage 368 of valve housing 360 as well as chamber or passage 365 in valve housing 361. A conduit 398 communicating with a source of clean ambient air, as within the air cleaner assembly 308, communicates with branch conduits 400 and 402 respectively leading to chambers 344 and 396.

The armature of the solenoid assembly comprises a valve member 403 having a valve body with generally axially extending flatted portions 405 which respectively provide for clearance space as between such flatted portions and the juxtaposed surface of inner passage or chamber 365. A compression spring 407 serves to continually urge valve member 403 to the right as to have valving end 409 thereof sealingly seat against conduit means 367. The armature of the solenoid assembly also comprises a valve member 404 having a valve body with generally axially extending flatted portions 406 which respectively provide for clearance space as between such flatted portions and the juxtaposed surface of inner passage or chamber 368. A compression spring 408 serves to continually urge valve member 404 to the left as to have the valving end 410 thereof sealingly seat against conduit 370.

In the preferred arrangement, additional conduit means 412 communicates as between conduit 374 and the throat area of venturi means 414 within the induction passage 304. Also, preferably, calibrated restriction means 416 is provided within conduit means 412.

Generally, as can be seen, ambient atmospheric air is supplied via conduit means 398 and 402 to chamber 396 and via conduit means 398 and 400 to chamber 344. Vacuum, both engine intake manifold vacuum and venturi vacuum, is applied via conduit means 412 and 374 to end 372 of conduit 374 which communicates with conduit 370 in valve housing 360. Further, the atmospheric air supplied to chamber 396 is communicated via conduit means 369 and 394 to passage or chambers 368 and 365.

As shown in FIG. 4, motor housing 347 is provided with passage means 411 and 413, preferably with calibrated restriction means 415 for placing chamber 343 in communication as with one end of a conduit member 417 the other end of which is engaged with valve housing body 361 as to be in communication with passage 367.

Also, with reference to FIG. 4, a passage or conduit means 425 communicates at one end with chamber 343 and, at its other end, communicates with passage or conduit means 427 preferably with calibrated passage or restriction means 429 and 431. Similarly, and preferably, conduit means 425 is provided with calibrated restriction means 433. As generally illustrated in FIG. 4, one end of conduit means 427 communicates with secondary induction passage means 303 in the vicinity of the throat of venturi 413 while the other end of conduit means 427 communicates with the primary induction passage means in the vicinity of the throat of venturi 414.

In an engine underspeed condition (a speed below a preselected desired governed maximum speed), transistor 124 will be in its "off" state and solenoid winding 296 will be in its de-energized state. Consequently, valve springs 407 and 408 will move valve members 403 and 404 respectively to the right and to the left and hold valving surfaces 409 and 410 sealingly seated against the inner ends of conduits 367 and 370 thereby preventing any communication of vacuum from conduit 374 into valve housing chamber 368 and any communication of atmospheric air from chamber 396 into conduit 417 and chamber 343 of vacuum motor 13. The valves 403 and 404 are also shown in simplified form, during this condition in FIG. 7. With the valve member 404 thusly resiliently held in its left-most position, atmospheric air is conveyed from bell chamber 396 through conduit means 369, 394, through the clearance spaces between respective flatted surfaces 406 and the juxtaposed inner surface of valve body inner chamber 368, through radial ports 364 and through passage means 366 into pressure motor chamber 346.

Accordingly, it can be seen that during such underspeed operating condition both sides of diaphragm 350 are exposed to the same pressure thereby effectively preventing the motor means 14 from exercising any control over the positioning of throttle valve 316 and thereby leaving such control over the positioning of throttle valve 316 exclusively to the operator actuated throttle actuating linkage means 340. At this particular underspeed condition, let it be assumed that the secondary or auxiliary throttle valve means 315 is still closed as depicted in either of FIG. 4 or 6.

Figure 7:
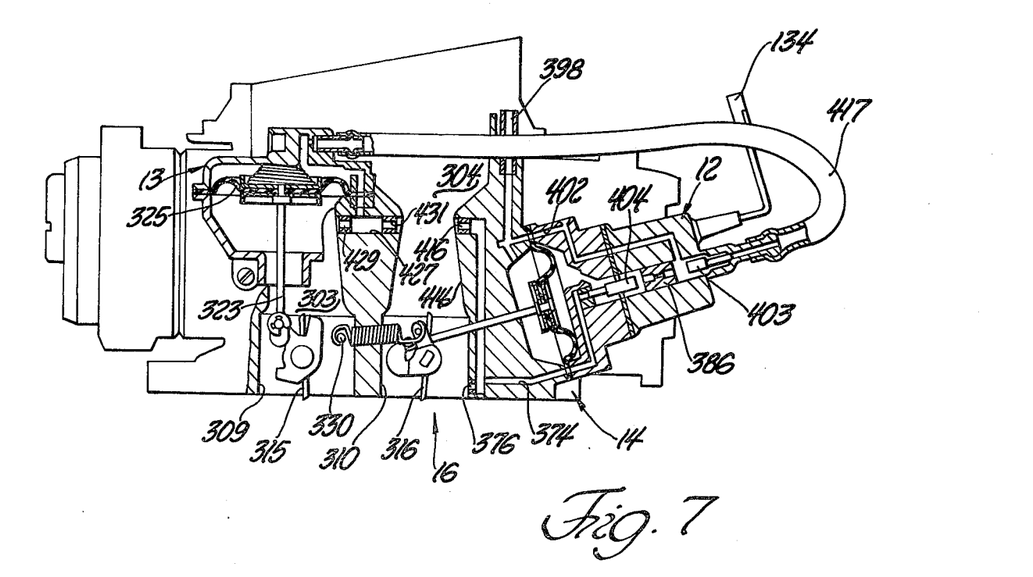

As the operator requests greater speed and power, as by further opening of primary or main throttle valve means 316, the velocity of air flow through the main or primary induction passage 304 starts to increase and consequently the resulting venturi vacuum at restriction 431 starts to increase. When the velocity of air flow increases sufficiently the then resulting primary venturi vacuum is sufficient (it being communicated to chamber 343 via restriction 431, conduit means 427 and 425) to cause diaphragm 325 to start to move upwardly thereby initiating opening of secondary or auxiliary throttle valve means 315. With continuing primary venturi vacuum increase and the progressive opening of secondary or auxiliary throttle valve means 315, the velocity of air flow through the secondary induction passage means 303 starts to increase ultimately resulting in a sufficient secondary venturi vacuum at restriction 429 (in the induction passage 303 venturi) as to have such result in an additive type of effect with the primary venturi vacuum and thereby assist in the further upward movement of diaphragm 325 and the accompanying further opening of secondary throttle valve means 315. Such further opening of both the primary and secondary throttle valves may, in fact, continue until both are in their respective fully opened conditions as generally depicted in FIG. 7. As should be apparent, this would occur when the engine, while at a speed less than desired or governed maximum speed, is experiencing high load demands.

As the speed of engine 30 approaches governed speed, current is applied via transistor 124 to solenoid winding 296 thereby causing a magnetic field which pulls armature-valve member 404 to the right until its end 418 abuts and seals against juxtaposed end 420 of body 386 which serves to seal and prevent communication of atmospheric air from chamber 396 through passage means 369, 394 and by valve member 404 through passage 366 into chamber 346. Simultaneously, with valve member 404 in its right-most position, free communication is completed as between end 372 of vacuum conduit means 374 and chamber 346 via valve housing conduit 370, inner chamber 368, ports 364 and passage 366. The same magnetic field pulls armature-valve member 403 to the left until its end 419 abuts against juxtaposed end 421 of body 386. Surfaces or ends 419 and/or 421 may have relieved portions or other clearances, as at 441, formed thereon as to not result in a sealing action between valve member 403 and member 386 when ends 419 and 421 thusly abut. On the contrary when valve member 403 is thusly moved to the left, ambient air in chamber 396 is communicated via conduit means 369, 394, 441, between flatted portions 405 and juxtaposed surface of chamber 365, through conduit means 367, 417, 413 and 411 to chamber 343 thereby effectively eliminating the vacuum in chamber 343 and permitting the spring 357 to move diaphragm 325 downwardly closing the secondary throttle valve means 315 to assume a position as depicted, for example, in either of FIG. 4 or 6.

It should be made clear that upon energization of the solenoid winding 296, neither valve 403 nor 404 are merely moved to the positions depicted in FIG. 6 to remain there. They are instead constantly moving in response to solenoid energization back and forth as between positions shown in both FIGS. 6 and 7.

Modulation between valve 403 positions of full "on" (valve member 403 being in its left-most position) and full "off" (valve member 403 being in its right-most position) results from varying the percentage of on-time of the current to solenoid winding 296 as already described with reference to FIG. 3. This results in an average valve opening, of valve end 409, that is related to the percentage of such on-time current flow which, in turn, is related to engine speed. Likewise, modulation between valve 404 positions of full "on" (valve member 404 being in its right-most position) and full "off" (valve member 404 being in its left-most position) results from varying the percentage of on-time of the current to solenoid winding 296 as also already described with reference to FIG. 3. This results in an average valve opening, of valve end 410, that is related to the percentage of such on-time current flow which, in turn, is related to engine speed.

Accordingly, generally, it can be seen that an engine speed is increasing and approaching governed speed, solenoid coil 296 is being intermittently energized as by the pulses from oscillator-amplifier means 246, transistor 116 and transistor 124. Correspondingly, armature-valve members 403 and 404 are reciprocating as between their two extreme positions and in so doing valve 404 starts to restrict the admission of atmospheric air into chamber 346 and starts to admit vacuum into the same chamber, while valve 403 starts to admit atmospheric air into motor chamber 343 via conduit means 417 as to reduce and eliminate the vacuum previously existing therein. As engine speed continues to increase and to more nearly approach governed speed, the percentage of pulse time (by the reduction of no pulse time) to transistors 116 and 124 increases thereby causing valve member 404 to spend a correspondingly increased time in its right-most position thereby further effectively restricting the admission of atmospheric air into chamber 346 and further admitting vacuum to the same chamber 346, and, at the same time, causing valve member 403 to spend a correspondingly increased time in its left-most position thereby further effectively increasing the admission of atmospheric air into chamber 343 via conduit means 417. Such a process continues as engine speed continues to approach governed speed until such preselected governed speed is attained at which time the pressure differential across diaphragm 350 is sufficient to adequately overcome calibration spring 328 and position throttle valve 316 as to maintain no more than governed speed even if the operator has actuated linkage means 340 to a position which would otherwise result in a greater engine speed. Of course, if the operator releases linkage means 340, spring 342 (through levers 336 and 332) returns throttle valve 316 toward its curb idle position. Usually, by the time that diaphragm 350 starts to take over and govern the position of throttle valve 316, spring 357 has already caused the secondary throttle valve means 315 to return to its closed position as generally depicted, for example, in either of FIG. 4 or 6.

Because valve member 404 is modulating and is capable of controlling both the admission of atmospheric pressure as well as the vacuum pressure it is capable of varying the governor diaphragm 350 pressure differential from a maximum to zero. This, in turn, enables an extremely wide range of throttle valve closing force to be developed.

Further, as is evident, the solenoid valve assembly, more specifically the winding 296 and armature-valve member 404, is a flowing system only during the governing band of engine operation. During underspeed (non-governed) operation the governor diaphragm 350 is connected, at both sides, directly to atmosphere and therefore exerts no residual force tending to close the throttle 316. Therefore, a spring 328 of lesser force or greater spring rate may be employed while still assuring that wide open throttle conditions can be attained. The use of such a lighter spring 328 improves the transient response of the governor system especially in cases where governed speed is low as in, for example, governed road speed and/or auxiliary power take-off trains.

The invention has been described with relation to a carburetor. However, the invention is not so limited in that it now should be apparent that it may be equally well practiced in relation to or in combination with any throttle controlled induction system feeding any motive fluid consuming engine whether of the external combustion or internal combustion type or other. Also, it should be apparent that the governor diaphragm assembly 14 need not be connected to the throttle means 16 normally controlled by the operator. That is, it is quite evident that the governor diaphragm motor means 14 may in fact be operatively connected to a normally full open throttle valve separate from throttle means 316 and situated downstream thereof. The same, as should now be evident, applies to motor means 13 and its association with throttling means functionally separate from throttle means 16.

The speed signal generating means diagrammatically illustrated at 19 is intended to encompass speed signal generating means other than that specifically illustrated at point 64 and conductor 102 of FIG. 2. That is, the invention is not limited to that precise means for developing such an input signal. For example, suitable speed signal generating means may comprise a rotating pulse wheel or gear and cooperating magnetic probe which, as each tooth or projection of the pulse wheel is brought into and out of juxtaposition with the probe, causes a signal to be generated in related coil and conductor means leading as to associated rectifier means and amplifier means, in turn, leading as to the input terminal 288 of control assembly 22.

Although only a preferred embodiment of the invention has been disclosed and described, it is apparent that other embodiments and modifications of the invention are possible within the scope of the appended claims.

What is claimed is:

1. A governor system for a combustion engine having motive fluid induction passage means, comprising variably positionable first and second throttle valve means for controlling the rate of flow of said motive fluid through said induction passage means and into said engine, first means for sensing the speed of monitored moving means associated with said engine and creating a speed signal in response thereto, electrical control means adapted to receive said speed signal and produce in response thereto an electrical output, first pressure responsive motor means comprising pressure responsive first movable wall means operatively connected to said first throttle valve means, means for providing a fluid pressure to at least one side of said first movable wall means, second pressure responsive motor means comprising pressure responsive second movable wall means operatively connected to said second throttle valve means, said means for providing fluid pressure to at least one side of said first movable wall means also providing a fluid pressure to at least one side of said second movable wall means, and solenoid valve means effective for modulating said fluid pressures as to thereby create pressure differentials across each of said first and second movable wall means, said solenoid valve means being adapted to receive said electrical output and to modulate said fluid pressures in accordance therewith as to thereby vary the magnitude of said pressure differentials in response thereto, said solenoid valve means being effective to increase the magnitude of said pressure differential across said first movable wall means and thereby cause said first movable wall means to move said first throttle valve means toward a more nearly closed position as the speed of said monitored moving means increases and approaches a preselected governed maximum speed while also being effective to decrease the magnitude of said pressure differential across said second movable wall means and thereby be effective for causing said second movable wall means to move said second throttle valve means toward a more clearly closed position as the speed of said monitored moving means increases and approaches said preselected governed maximum speed.

2. A governor system according to claim 1 and further comprising spring means operatively connected to said first throttle valve means and effective to normally urge said first throttle valve means in the throttle opening direction.

3. A governor system according to claim 1 wherein said second movable wall means comprises diaphragm means, wherein said means for providing fluid pressure comprises a source of fluid pressure of a magnitude less than the magnitude of atmospheric pressure, and wherein said solenoid valve means modulates the effective magnitude of said fluid pressure applied to said diaphragm means.

4. A governor system according to claim 1 wherein said electrical control means is effective to produce said electrical output only as the speed of said monitored moving means closely approaches said governed speed.

5. A governor system according to claim 1 wherein said first movable wall means comprises diaphragm means, wherein said means for providing fluid pressure comprises a first source of a first fluid pressure of a generally constant first magnitude and a second source of a second fluid pressure of a second magnitude differing from said first magnitude, and wherein said solenoid valve means modulates the effective magnitude of said second fluid pressure applied to said diaphragm means.

6. A governor system according to claim 5 wherein said first source of a first fluid pressure is the ambient atmosphere, wherein said first magnitude is generally ambient atmospheric pressure, wherein said second source of a second fluid pressure comprises engine intake manifold vacuum, wherein said second magnitude varies in response to engine speed and load, wherein said solenoid valve means comprises a movable valve member movable as between first and second extreme positions, said valve member being effective when moved to said first extreme position to totally terminate the application of said second fluid pressure from said second source to one side of said diaphragm means, and to enable the total communication of said first fluid pressure to said one side of said diaphragm means, said valve member being effective when moved to said second extreme position to totally terminate the application of said first fluid pressure to said one side of said diaphragm means and to enable the total communication of said second fluid pressure to said one side of said diaphragm means, and wherein said valve member modulates the said effective magnitude of the fluid pressure against said one side of said diaphragm by cyclically moving to and between said first and second extreme positions.

7. A governor system according to claim 6 and further comprising spring means operatively urging said valve member toward one of said extreme positions.

8. A governor system according to claim 7 wherein said solenoid valve means comprises a solenoid coil, wherein said valve member comprises a solenoid armature, wherein said spring means urges said valve member toward said first extreme position, and wherein said solenoid coil when energized in response to said electrical output moves said valve member toward said second extreme position against the resilient resistance of said spring means.

9. A governor system according to claim 6 wherein said second source of a second fluid pressure further comprises vacuum sensing port means effective to sense and transmit a fluid pressure generated in response to the velocity rate of flow of motive fluid through said induction passage means.

10. A governor system according to claim 3 wherein said source of fluid pressure comprises a vacuum created in response to rate of flow of said motive fluid through said induction passage means, wherein the magnitude of said vacuum increases as the rate of flow of said motive fluid through said induction passage means increases, wherein said solenoid valve means comprises a movable valve member movable as between first and second extreme positions, said valve member being effective when moved to said first extreme position to enable full application of said vacuum to said diaphragm means, said valve member being effective when moved to said second extreme position to communicate a second pressure of significantly greater magnitude than said vacuum to said diaphragm means, and wherein said valve member modulates the effective fluid pressure applied to said diaphragm means resulting from the application of said vacuum and the communication of said second pressure by cyclically moving to and between said first and second extreme positions.

11. A governor system according to claim 10 wherein said induction passage means comprises first and second induction passage means, wherein said first throttle valve means controls the flow of motive fluid through said first induction passage means and wherein said second throttle valve means controls the flow of motive fluid through said second induction passage means, and wherein said source of fluid pressure further comprises vacuum sensing port means in said first induction passage means effective to sense and transmit said vacuum from said first induction passage means to said diaphragm means.

12. A governor system according to claim 11 and further comprising additional vacuum sensing port means in said second induction passage means also effective to sense and transmit said vacuum from said second induction passage means to said diaphragm means.

13. A governor system according to claim 10 and further comprising spring means operatively urging said valve member toward one of said extreme positions.

14. A governor system according to claim 13 wherein said solenoid valve means comprises a solenoid coil, wherein said valve member comprises a solenoid armature, wherein said spring means urges said valve member toward said first extreme position, and wherein said solenoid coil when energized in response to said electrical output moves said valve member toward said second extreme position against the resilient resistance of said spring means.

15. In an engine speed governor of the type employing a first pressure responsive movable diaphragm for positioning in response to a first variable pressure differential thereacross related first throttle valve means during governed speed engine operation and a second pressure responsive movable diaphragm for positioning in response to a second variable pressure differential thereacross related second throttle valve means, the improvement of first valving means for controlling the degree of communication of two different sources of two different fluid pressures to one side of said first diaphragm as to thereby cause said pressure differential to be determined generally by said two different fluid pressure on said one side of said diaphragm and a third reference pressure on a second side of said diaphragm opposite to said one side, and second valving means for controlling the degree of communication of one of said two different sources of two different fluid pressures and a source of a fourth fluid pressure to one side of said second diaphragm as to thereby cause said second pressure differential to be determined generally by said one of said two different fluid pressures and said fourth fluid pressure compared to said third reference pressure also applied to a second side of said second diaphragm opposite to said one side of said second diaphragm.

* * * * *